United States Patent [19]

Tangonan et al.

[11] Patent Number: 4,701,009

[45] Date of Patent: Oct. 20, 1987

[54] SPECTRAL FILTER FOR INTEGRATED OPTICS

[75] Inventors: Gregory L. Tangonan, Oxnard; Huan-Wun Yen, Westlake Village, both of Calif.

[73] Assignee: Hughes Aircraft Company, Los Angeles, Calif.

[21] Appl. No.: 697,802

[22] Filed: Feb. 4, 1985

[51] Int. Cl.$^4$ .............................................. G02B 6/10
[52] U.S. Cl. ........................... 350/96.12; 350/96.14
[58] Field of Search ............... 350/96.11, 96.12, 96.13, 350/96.14, 96.19, 96.30, 96.34, 311, 314, 317

[56] References Cited

U.S. PATENT DOCUMENTS

| | | | |
|---|---|---|---|
| 3,909,108 | 9/1975 | Taylor | 350/96.14 |
| 4,146,297 | 3/1979 | Alferness et al. | 350/96.14 |
| 4,223,977 | 9/1980 | Papuchon et al. | 350/96.12 X |
| 4,279,464 | 7/1981 | Colombini | 350/96.11 X |

Primary Examiner—Eugene R. Laroche
Assistant Examiner—Steven J. Mottola
Attorney, Agent, or Firm—V. D. Duraiswamy; V. G. Laslo; A. W. Karambelas

[57] ABSTRACT

A spectral filter for an integrated optic application, such as in an optical demultiplexer (14), is provided and includes a common input waveguide (20) integrally connected to a pair of optical output waveguides (22, 24). The material selected for the output waveguides (22, 24) can be semiconductor material that provides a low index of refraction for a specific wavelength in one output waveguide and a relatively higher index of refraction for the same wavelengths in the other output waveguide, the output waveguide materials being interrelated in that they have a common index of refraction for at least one wavelength across the spectrum of radiation. An incident spectrum of radiation (16) can be split into at least a pair of bandwidths of radiation to provide a spectral filter function.

15 Claims, 4 Drawing Figures

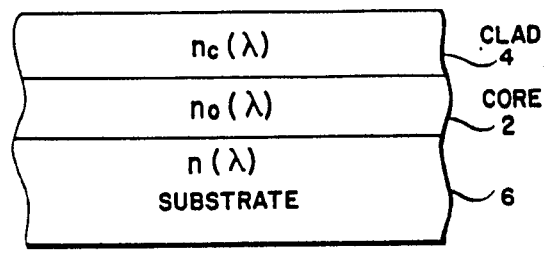
FIG. 1
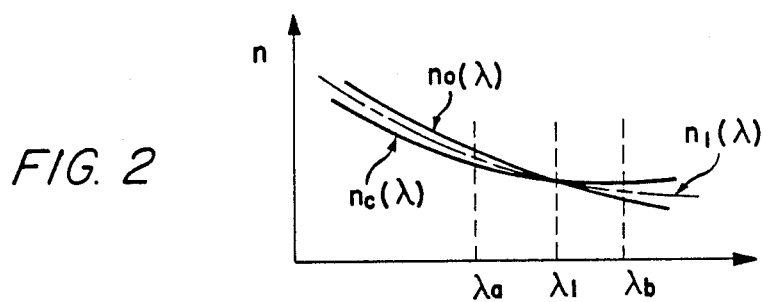
FIG. 2
FIG. 3
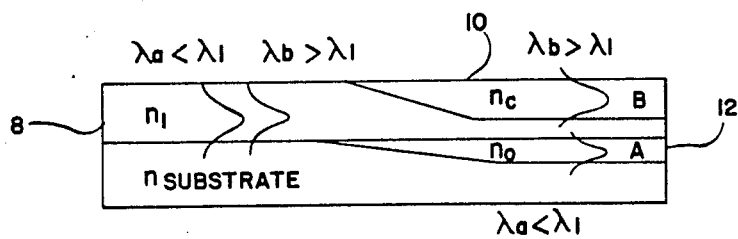

SPECTRAL FILTER FOR INTEGRATED OPTICS

BACKGROUND OF THE INVENTION

The present invention is directed to the separation fo bandwidths of energy in an electro-optical device such as a spectral filter integrated into an optical demultiplexer.

Recent progress in the manufacture of optical fibers and optical waveguides with a wide low-loss spectral window of 0.8 to 1.6 μm and of low threshold, long life semiconductor light sources covering the corresponding wavelength region, has made wavelength division multiplexing possible. The prior art has long recognized the advantage of optics in the transmission of a high density of information over multiple wavelengths. It is possible to have multiple transmission channels using a single optical fiber, thereby increasing the information capacity of a single optical fiber, and further realizing full duplex transmission of various types of digital and analog modulated signals. The use of such a multiplexing system, comprising a multiplexer and a demultiplexer are necessary for the transmitter and receiver, respectively. A multiplexer broadly consists of input fibers (each coupled to a source of a separate wavelength), a multiplexing circuit and a transmission fiber.

The demultiplexer consists of a transmission fiber, a demultiplexing circuit and output fibers. The multiplexing circuit couples optical signals of different wavelengths to a single transmission fiber and a demultiplexer circuit separates these optical multiple signals. An important element in the demultiplexing circuit is the capacity of separating the wavelengths for subsequent signal processing. The prior art has suggested various forms of diffraction gratings, refraction devices, prisms and thin-film filters for isolating selected bandwidths of energy. The gratings, refraction devices and prisms are angular dispersive devices, while the filters are wavelength selective devices. Generally, thin-film filters or dichroic filters have been provided in conventional optical instruments for separating one or more wavelengths such as in the video disk technology and various eye examining medical instruments.

The prior art is also aware of the advantages of miniaturized integrated optic technology wherein it is possible to fabricate a number of planar optical elements on a common substrate. Generally, such structures have the distinct advantages of compactness, ruggedness and minimal space requirements. The ability to adapt the conventional large-scale angular dispersive devices and wavelength selected devices of the conventional optic prior art is limited in the integrated optics field. The ability to deposit multilayer film upon substrate chip edge is both very difficult and an impractical solution given the fact the planar layers or waveguides of an integrated optic circuit are usually within the range of 0.2 to 2 μm thick.

Thus, the prior art is still seeking to provide a broadband filter in a planar geometry for interfacing with fiber optics to perform the equivalent operation of the conventional dichroic filter.

SUMMARY OF THE INVENTION

The present invention provides a planar optical spectral filter for use in integrated optics on a common substrate. One practical application for such a spectral filter is its integration into an improved integrated optical demultiplexer. The spectral filter includes a common input waveguide capable of transmitting a multispectral bandwidth of radiation that is integrally communicating with at least a pair of output waveguides. Preferably, output waveguides have an adiabatic tapered coupler section to minimize energy loss. One output waveguide is formed of a relatively low index of refraction material for shorter wavelengths within the multispectral radiation range. The other output waveguide is formed of a relatively higher index of refraction material for the same shorter wavelengths. The respective material of each of the output waveguides is selected so that they have a common index of refraction for at least one wavelength across the spectrum of radiation that they are to receive. The materials used for the waveguides are preferably semiconductor ternary and quaternary alloys that are of type similar to the substrate. As a result of the above characteristic, an incident spectrum of radiation can be split into a first bandwidth of radiation of wavelengths equal to or greater than the wavelength of the common index of refraction in one output waveguide, and a second bandwidth of radiation of wavelengths equal to or lesser than the wavelength of the common index of refraction in the other output waveguide. As can be appreciated, this branching effect can be repeated downstream for each of the output waveguides with other compatible material to again branch selected sub-bandwidths of radiation energy.

In one preferred embodiment disclosed herein, in the form of an optical demultiplexer positioned on a common substrate, means are provided for further separating the desired channels or bands of wavelength energy by, for example, conventional Bragg diffraction gratings. In the preferred embodiment disclosed herein, the output waveguides of the demultiplexer were selected from a cadmium selenium sulfide compound.

The features of the present invention which are believed to be novel can be best understood, together with further objects and advantages, by reference to the following description, taken in conjunction with the accompanying drawings.

BRIEF DESCRIPTION OF THE DRAWINGS

FIG. 1 is a schematical cross-section of a planar waveguide geometry;

FIG. 2 is a graph of the dispersion curves of the core and cladding materials;

FIG. 3 is a schematic representation of separating the wavelength band through a spectral filter that utilizes the dispersion curve of FIG. 2.

DESCRIPTION OF THE PREFERRED EMBODIMENT

Figure 4:
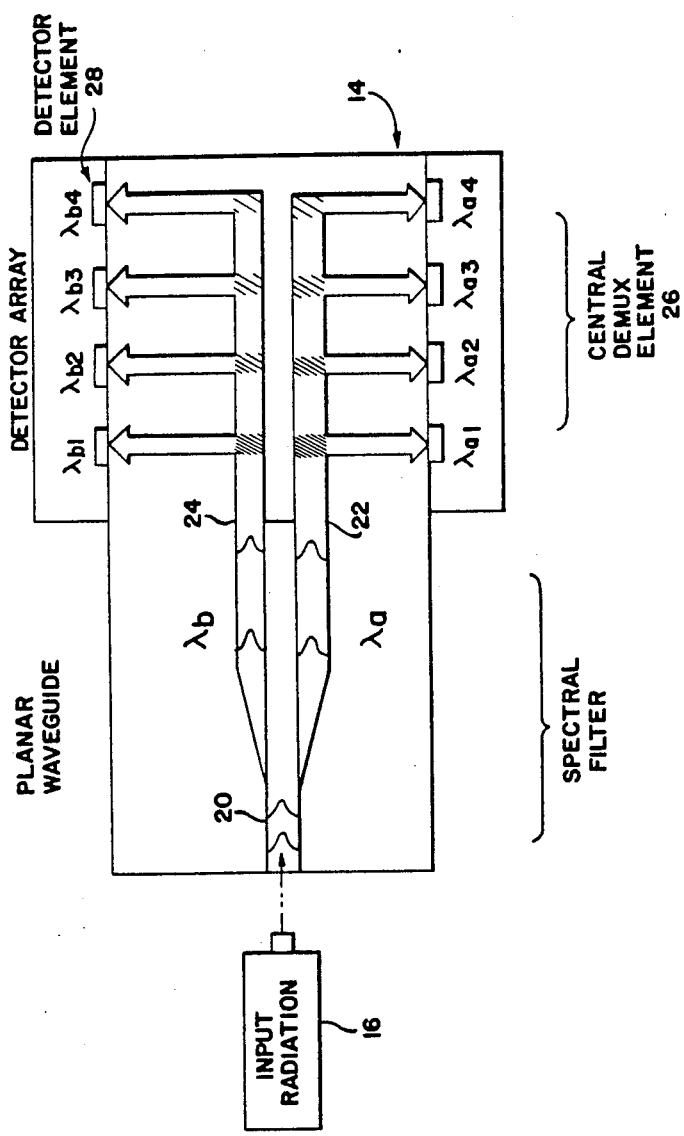
FIG. 4 is a schematic illustration of an integrated optics demultiplexer circuit.

The following specification, taken in conjunction with the drawings, sets forth the respective spectral filter and integrated optics demultiplexer of the present invention in such a manner that any person skilled in the electro-optical field can utilize the invention. The embodiments and invention disclosed herein are the best modes contemplated by the inventors of carrying out their invention, although it should be understood that various modifications can be readily accomplished within the parameters of the invention.

Referring to FIG. 1, a schematic configuration of an optical planar waveguide is disclosed comprising a core material 2 with an index of refraction $n_o(\lambda)$ and a cladding material 4 with an index of refraction of $n_c(\lambda)$ on a substrate 6 having an index of refraction of $n(\lambda)$. Generally, the boundary of a waveguide, such as the core disclosed in FIG. 1, will be defined by material having a lower index of refraction that the waveguide. The substrate 6 in the present invention is preferably formed of the same type of crystal structure as the desired core waveguide 2. In effect, the substrate will be of a semiconductor material that will be the host crystal in forming the waveguide. In the preferred embodiment of the present invention, a semiconductor material such as cadmium selenide or gallium arsenide is contemplated. The substrate can be appropriately grown as a crystal structure (as known in the art) and the waveguides will be subsequently deposited in the substrate.

The present invention relies upon the appropriate selection of at least two separate materials whose indexes of refraction vary according to wavelength and in a predetermined relationship to each other. As shown in FIG. 2 each material has its own index of refraction, illustrated as $n_o(\lambda)$ and $n_c(\lambda)$, where the subscripts o and c refer to core and cladding respectively. The magnitude of the respective indexes of refraction vary according to the wavelength of optical radiation transmitted through the material. However, as also shown in FIG. 2, the indexes of refraction for the two materials vary with wavelength such that for a common wavelength $\lambda_1$, the index of refraction of the core and cladding materials are equal. As a result of this relationship, two spectral bands of wavelengths represented in FIG. 2 as $\lambda_a$ and $\lambda_b$ can be separated to provide, in effect, a dichroic filter effect. Thus, wavelengths of $\lambda_b$ will be transmitted to the cladding material, while wavelengths of $\lambda_a$ will be transmitted to the core material. It is believed that several combinations of semiconductor ternary and quaternary compounds exhibit this property of providing an index of refraction coincident at some wavelength within their respective transmission bands. As can be readily appreciated, having such a transition wavelength at some point intermediate the transmission bands of a pair of matching material would be highly desirable for providing the filtering effect presented in the present invention. Thus, a dichroic filter effect which is found highly useful in a conventional optic application can be achieved in an integrated optics application.

A ternary compound of cadmium selenium sulfide can be used in the present invention. A specific example, is an alloy of this material comprising the following formula:

$$Cd\ Se_x\ S_{1-x}$$

A waveguide of the present invention can be manufactured using the above formula where the core material comprises material for which the value of $x=x_o$ is approximately 0.2 and the cladding material comprises material for which the value of $x=x_c$ is approximately 0.08. With such a mixture of material, the crossover or common wavelength would occur at approximately 6000 Å. The physical basis for this phenomenon is the increased index dispersion for wavelengths close to the band edge of the material. In the embodiment represented in FIG. 2 of the cadmium selenium sulfide compound, the core material will have a smaller band gap than the cladding material.

Referring to FIG. 3, a filter branching structure is disclosed wherein an input waveguide 8, formed of a related material, having an index of refraction $n_1$ is subsequently split into two output waveguides 10 and 12. For purposes of our illustration, the mode dispersion of the radiation is assumed to behave very similarly to the index dispersion, and accordingly, the waveguide mode index for the input guide 8 is assumed to be $n_1$. This material will have an intermediate composition from that of the subsequent output waveguides 10 and 12 which have waveguide mode indexes of $n_c$ and $n_o$. The input waveguide 8, in the case of a cadmium selenium sulfide ternary compound, would have a value $x_1=0.14$. Input radiation of a wide spectral range, e.g., a 0.5 to 2.0 μm band, would propagate along the input waveguide 8. Adiabatic tapered output waveguides 10 and 12 interface integrally with the input waveguide 8 to provide separate paths for wavelengths above and below a common wavelength, $\lambda_1$.

From FIG. 3, it can be seen that $\lambda_b$ is propagated in the upper output waveguide 10 and $\lambda_a$ in the lower output wavegide 12. The advantages of the adiabatic tapering structure is so that there will be a low energy loss (<1 dB). As can be appreciated, the common wavelength, $\lambda_1$, radiation will be shared by each of the ports of the output waveguides.

Referring to FIG. 4, an application of the spectral filtering characteristics of the present invention is shown in the format of an optical demultiplexer 14. Input radiation from an optical radiation source 16 is coupled to an input waveguide 20 formed of an intermediate semiconductor alloy material. Radiation source 16 can be one of a variety of sources including lasers, optical fibers, semiconductor structures, and collimators for optical radiation detection. The input waveguide 20 is connected to a spectral filter section which includes a pair of branching tapered output waveguides 22 and 24, to respectively receive the wavelengths $\lambda_a$ and $\lambda_b$. For example, if a wide spectral range, say from 0.5 to 2.0 μm, is presented at the input waveguide 20, the spectral filter section can be used to split this radiation into a 0.5 to 1.0 μm band in waveguide 22 and a 1.0 to 2.0 μm band in waveguide 24. As a result, each band will propagate within its own separate output waveguide. This is a particularly advantageous approach because the more conventional grating demultiplexers used in integrated optic applications are now required to operate over a single octave and not two octaves. Radiation coupling is a particularly serious problem in two octave designs. The use of the present invention will eliminate this problem.

The central demultiplexer portion 26 can be of a conventional configuration, and as disclosed herein, separate Bragg gratings of an appropriate grating period and groove depth can be etched or cut into the waveguide for providing desired wavelengths to detector elements 28, as can be seen in FIG. 4. As can be readily appreciated, other forms of wavelength dividers such as Chirp gratings could be used.

It is believed that the application of our spectral filter will provide other advantages such as the prevention or minimization of cross talk due to harmonics of the shorter wavelengths signal. As is known, the Bragg refraction efficiency is not 100%, and the remaining optical power that is not refracted can produce a second order Bragg refraction if it encounters a section of the grating with a period that is a multiple of the original grating period. This signal can, of course, constitute cross talk or false identification of an input. By the use of our dichroic filter before the detector array, this problem can be minimized.

As can be readily appreciated, the optical demultiplexer can be integrated onto the same substrate as the spectral filter section. The gratings can be fabricated by multiple holographic exposures, as known in the prior art. The waveguides can be formed by epitaxial growth, diffusion, or sputtering deposition techniques, which are also known in the prior art.

It should be appreciated that the disclosure of FIG. 4 is to illustrate the principles of the present invention in the format of an improved optical demultiplexer. From a practical viewpoint, the actual position and arrangement of the waveguides and detectors may be provided at different positions than that shown in FIG. 4. For example, the optical waveguides may actually overlap each other, and the lower waveguide may be exposed by chemical etching after termination of the upper waveguide. In this regard, the Bragg grating diffractions or other dispersive or reflective elements would be actually aligned, although on different levels of the substrate.

In summary, the present invention provides a spectral filter for integrated optical application, for example, in a planar geometry. A common optical input waveguide capable of receiving a multispectral bandwidth of radiation interfaces with at least a pair of optical output waveguides. More than a pair of optical waveguides are believed to be possible within the principles and teachings of the present invention. At least one output waveguide is formed of a low index of refraction material for a shorter wavelength within the multispectral radiation range, and the other output waveguide is formed of a relatively higher index of refraction material for the same shorter wavelengths. This relationship is disclosed in FIG. 2. Also, as shown in FIG. 2, the respective output waveguide material is interrelated in that they have a common index of refraction for at least one wavelength across the spectrum of radiation whereby an incident spectrum of radiation will be split into a first bandwidth of radiation of wavelengths equal to or greater than the wavelength of the common index of refraction, e.g., $\lambda_b$, and a second bandwidth of radiation of wavelengths equal to or lesser than the wavelength of the common index of refraction in the other output waveguide, e.g., $\lambda_a$. The waveguides and substrate are preferably formed of a cadmium selenide II-VI material or some other semiconductor ternary and quaternary compound or alloy that is capable of exhibiting the interrelationship of a common index of refraction for at least one wavelength across the desired bandwidth of energy.

The present invention can be particularly utilized to form an improved optical demultiplexer which can incorporate the spectral filter effect for splitting the input transmission bandwidth into a relatively low and high bandwidth of energy. Means are then provided for processing each of the bandwidths to segregate the desired channel or wavelength of information being transmitted. Such separating devices can include but are not limited to Bragg dispersion gratings. Conventional semiconductor detectors can then be used for detecting the separate wavelengths and producing appropriate electrical signals for subsequent processing.

As can be readily appreciated, it is possible to deviate from the above embodiments of the present invention and, as will be readily understood by those skilled in the electro-optical art, the invention is capable of many modifications and improvements within the scope and spirit thereof. Accordingly, it will be understood that the invention is not to be limited by the above specific embodiments, but only by the scope and spirit of the appended claims.

What is claimed is:

1. A spectral filter for an integrated optic application comprising:
   a common optical input waveguide capable of receiving a multispectral bandwidth of radiation; and
   at least a pair of optical output waveguides integrally communicating with the input waveguide, one output waveguide formed of a low index of refraction material for shorter wavelengths within the multispectral radiation range and the other output waveguide formed of a relatively higher index of refraction material for the same shorter wavelengths, the respective output waveguide materials being interrelated in that they have a common index of refraction for at least one wavelength within the multispectral bandwidth of radiation whereby an incident multispectral bandwidth of radiation is split into a first bandwidth of radiation of wavelengths equal to or greater than the wavelength of the common index of refraction in one output waveguide and a second bandwidth of radiation of wavelengths equal to or lesser than the wavelength of the common index of refraction in the other output waveguide.

2. The filter of claim 1 wherein the output waveguides integrally communicate with an adiabatic tapered coupler section to minimize radiation losses.

3. The filter of claim 1 wherein each of the output waveguides is formed of a cadmium selenium sulfide compound.

4. The filter of claim 1 wherein each of the output waveguides is formed of a cadmium selenium sulfide compound having the formula:

$$Cd\, Se_x\, S_{1-x}$$

wherein in one output waveguide $x=0.08$ and in the other output waveguide $x=0.2$.

5. The filter of claim 4 wherein the input waveguide is formed of a cadmium selenium sulfide compound wherein $x=0.14$.

6. A planar optical spectral filter for an integrated optic application on a common substrate comprising:
   a common optical input waveguide capable of receiving a multispectral bandwidth of radiation; and
   at least a pair of optical output waveguides integrally communicating with the input waveguide, each output waveguide having an adiabatically tapered coupler section to the input waveguide, one output waveguide formed of a low index of refraction material for shorter wavelengths within the multispectral radiation range and the other output waveguide formed of a relatively higher index of refraction material for the same shorter wavelengths, the respective output waveguide materials being interrelated in that they have a common index of refraction for at least one wavelength across the spectrum of radiation whereby an incident spectrum of radiation will be split into a first bandwidth of radiation of wavelengths equal to or greater than the wavelength of the common index of refraction in one output waveguide and a second bandwidth of radiation of wavelengths equal to or lesser than the wavelength of the common index of refraction in the other output waveguide.

7. The planar filter of claim 6 wherein each of the output waveguides is formed of a cadmium selenium sulfide compound.

8. The planar filter of claim 6 wherein each of the output waveguides is formed of a cadmium selenium sulfide compound having the formula:

$$Cd\ Se_x\ S_{1-x}$$

wherein in one waveguide $x=0.08$ and in the other waveguide $x=0.2$.

9. The planar filter of claim 8 wherein the input waveguide is formed of a cadmium selenium sulfide compound wherein $x=0.14$.

10. An improved optical demultiplexer for an integrated optics appliction comprising:
 coupling means for optically coupling to a multispectral bandwidth of optical radiation including an input waveguide;
 at least a pair of output waveguides integrally communicating with the input waveguide, one output waveguide formed of a low index of refraction material for shorter wavelengths within the multispectral radiation range and the other output waveguide formed of a relatively higher index of refraction material for the same shorter wavelengths, the respective output waveguide materials being interrelated in that they have a common index of refraction for at least one wavelength across the spectrum of radiation whereby an incident spectrum of radiation will be split into a first bandwidth of radiation of wavelengths equal to or greater than the wavelength of the common index of refraction in one output waveguide and a second bandwidth of radiation of wavelengths equal to or lesser than the wavelength of the common index of refraction in the other output waveguide;
 means for separating at least one wavelength from each band of wavelengths transmitted by the output waveguides; and
 means for detecting the separated wavelengths.

11. The demultiplexer of claim 10 wherein the output waveguides integrally communicate with an adiabatic tapered coupler section to minimize radiation losses.

12. The demultiplexer of claim 10 wherein each of the output waveguides is formed of a cadmium selenium sulfide.

13. The demultiplexer of claim 10 wherein each of the output waveguides is formed of a cadmium selenium sulfide compound having the formula:

$$Cd\ Se_x\ S_{1-x}$$

wherein in one waveguide $x=0.08$ and in the other waveguide $x=0.2$.

14. The demultiplexer of claim 13 wherein the input waveguide is formed of a cadmium selenium sulfide compound wherein $x=0.14$.

15. The demultiplexer of claim 10 wherein the means for separating includes Bragg grating couplers for directing separated wavelengths to the means for detecting.

* * * * *